No. 618,874. Patented Feb. 7, 1899.
H. E. HENWOOD.
BICYCLE.
(Application filed Nov. 23, 1896.)
(No Model.) 2 Sheets—Sheet 2.
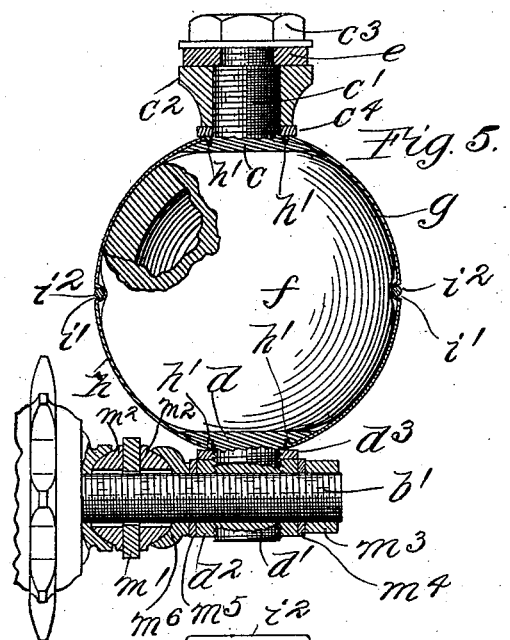
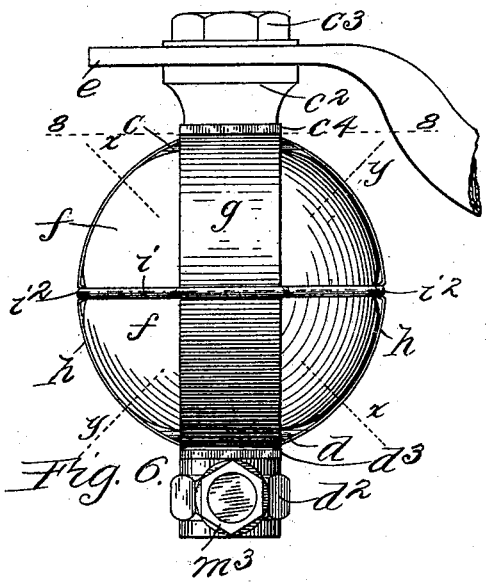
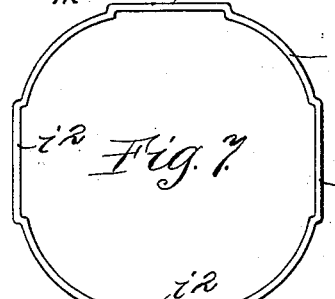
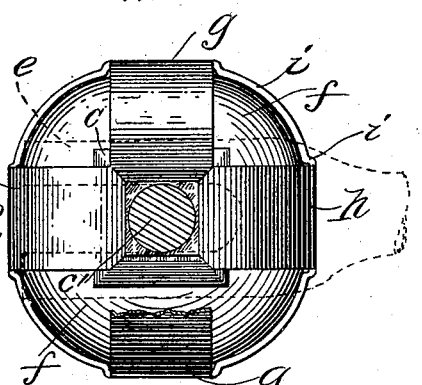
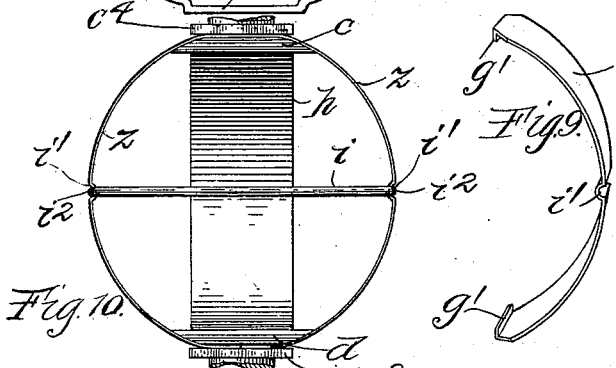
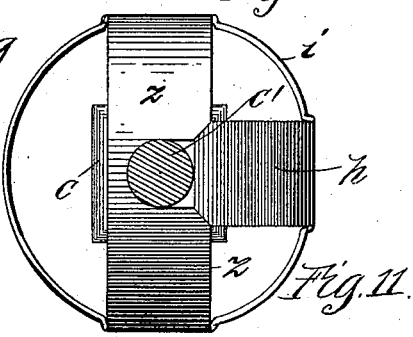
Witnesses:
Inventor,
Horace E. Henwood,
By Barton & Brown
Attorneys.
THE NORRIS PETERS CO., PHOTO-LITHO., WASHINGTON, D. C.

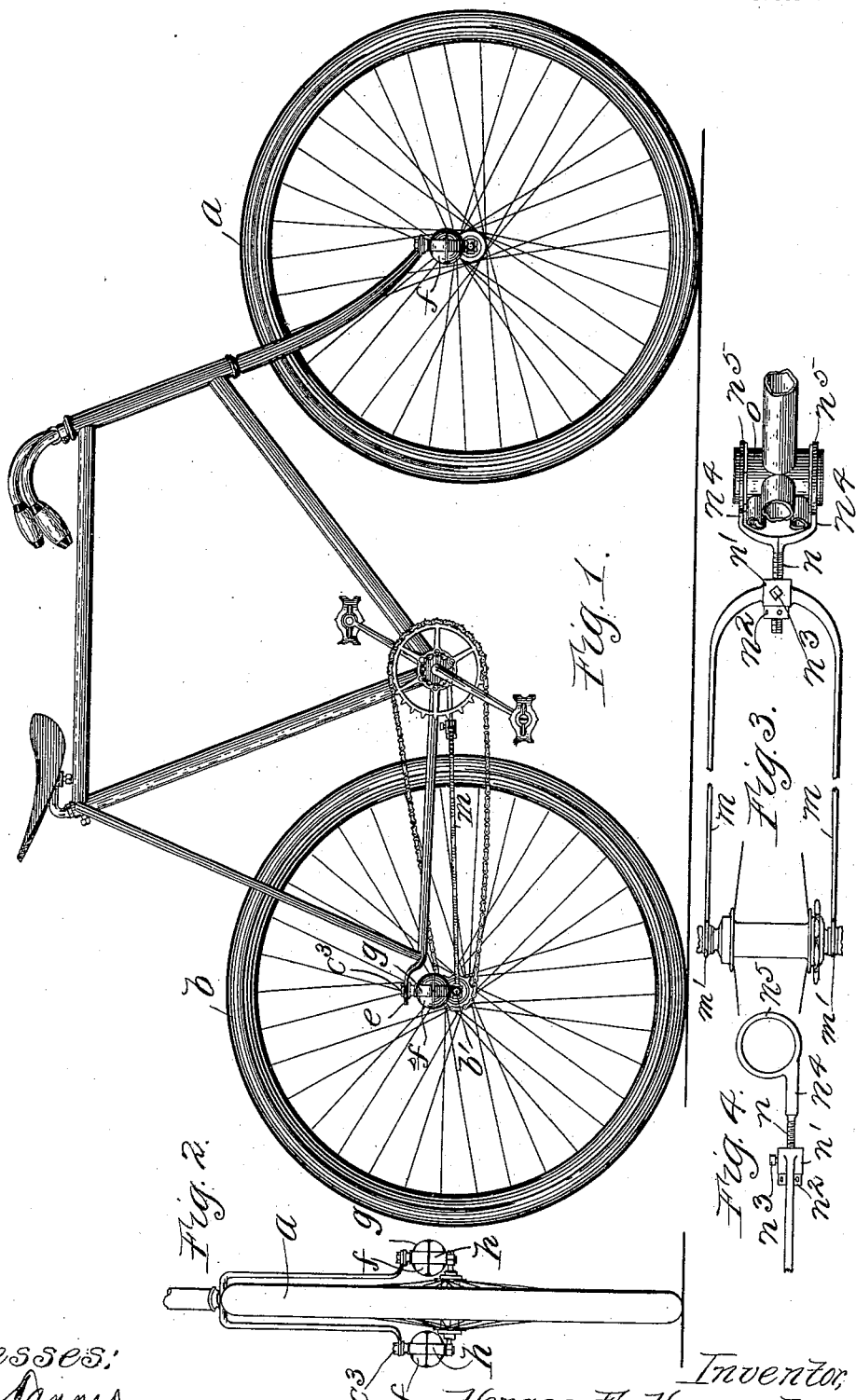

UNITED STATES PATENT OFFICE.

HORACE E. HENWOOD, OF CHICAGO, ILLINOIS.

BICYCLE.

SPECIFICATION forming part of Letters Patent No. 618,874, dated February 7, 1899.

Application filed November 23, 1896. Serial No. 613,175. (No model.)

*To all whom it may concern:*

Be it known that I, HORACE E. HENWOOD, a subject of the Queen of Great Britain, residing at Chicago, in the county of Cook and State of Illinois, have invented a certain new and useful Improvement in Bicycles, (Case No. 1,) of which the following is a full, clear, concise, and exact description, reference being had to the accompanying drawings, forming a part of this specification.

My invention relates to vehicles, and more particularly to that class of vehicles known as "safety-bicycles," and has for one of its objects the provision of improved means for yieldingly mounting the vehicle-wheels to relieve the rider of sudden jars or jolts as the vehicle contacts with obstructions or irregularities upon the roadway.

Heretofore the wheels of bicycles have been yieldingly mounted upon bicycle-frames by springs composed of strip metal disposed upon the machine parallel with its wheels, each set of springs being disposed in one plane. Springs of this character are apt to flex in any direction when the wheels supported thereby meet with obstacles, the wheels being thereby injured and the machine rendered unstable. I have discovered that springs of this character may be caused to flex in a uniform direction by connecting an additional or auxiliary spring at an angle thereto between the united parts and disposing the same in a different plane.

My invention has for a further object the provision of improved means for adjustably mounting the driving-wheels of bicycles.

My invention has further features which I will explain hereinafter.

I will explain my invention more particularly by reference to the accompanying drawings, in which—

Figure 1 is a side elevation of a bicycle constructed in accordance with my invention. Fig. 2 is a front view of a portion thereof.
Fig. 3 is a plan view of the mechanism I employ for adjusting the driving-wheel of the bicycle. Fig. 4 is a side elevation of the front portion of the mechanism shown in Fig. 3. Fig. 5 is a vertical sectional view of one of the supports on a plane through the axis of the rear wheel. Fig. 6 is a side elevation of the support shown in Fig. 5. Fig. 7 is a plan view of a retaining-spring I preferably employ in connection with the spring-support of my invention. Fig. 8 is a plan view of a spring-support on line 8 8 of Fig. 6. Fig. 9 is a detail view of one of the springs employed in my improved support. Fig. 10 is a side elevation of a modified form of support constructed in accordance with my invention. Fig. 11 is a plan view thereof.

Like letters refer to like parts throughout the different views.

I have shown my invention as being applied to a well-known form of safety-bicycles employing a diamond frame supporting a front steering-wheel $a$ and a rear driving-wheel $b$. The spring-supports are preferably constructed as shown in Figs. 1, 2, 5, 6, 7, 8, and 9. Two spring-supports are provided in connection with each wheel, one on each side of the hub. Each support is provided with two retaining-plates $c$ and $d$, provided with threaded stems $c'$ $d'$, respectively. A nut $d^2$ is screwed upon stem $d'$, this nut having apertures formed in its opposite walls adapted to be brought into alinement with an aperture formed in stem $d'$, these apertures being adapted to receive the shafts of the wheels. The manner of mounting the supports upon the shafts is more fully shown in Fig. 5, wherein I have shown a threaded shaft $b'$ of the rear driving-wheel which is passed through the stem $d'$ and nut $d^2$. The apertures or bores in stem $d'$ and nut $d^2$ are preferably smooth, so that the shaft may be readily passed through the same. A sleeve $c^2$, provided with a flared top, is screwed upon the stem $c'$, a cap-nut $c^3$ being screwed upon a reduced portion of this stem, between which and the sleeve $c^2$ a portion of the frame is adapted to be secured. A brace-piece $e$, forming part of the framework, is disposed upon each side of the rear wheel. The ends of the brace-pieces $e$ are forked, as shown in Fig. 5 and in dotted lines in Fig. 8, the stems $c'$ of the rear supports being thus adjustable toward and away from the crank-shaft, this adjustment being maintained by the cap-nuts $c^3$. The fork sides of the front portion of the frame are preferably curved outwardly, as shown most clearly in Fig. 2, the ends whereof are secured between the cap-nuts $c^3$ and the sleeves $c^2$.

A cushion in the form preferably of a hollow rubber ball $f$ is disposed between the plates $c$ and $d$. The hollow rubber ball acts as a pneumatic cushion and absorbs the vibrations received by the wheel in coming in contact with obstructions upon the road. I preferably rest the upper plate $c$ upon the top of the ball, and in order to secure a flexible union between the plates $c$ and $d$ I unite the same preferably by two sets of springs, one of which is composed of springs $g$ $g$, while the second set is composed of springs $h$ $h$, placed at an angle to springs $g$ $g$. Lips $g'$ $g'$ are formed upon each of the springs $g$, while lips $h'$ $h'$ are formed upon each of the springs $h$. The springs are formed of strips of spring metal, the ends whereof are rested upon the plates $c$ and $d$, which are preferably square. The plates $c$ and $d$ are provided with lip-seats, as shown, which receive the lips formed upon the springs. A square washer $c^4$ is interposed between the sleeve $c^2$ and the plate $c$, while a similar washer $d^3$ is interposed between plate $d$ and nut $d^2$, the springs being firmly engaged between said washers and plates. I preferably surround the springs with a retaining-spring $i$, formed, preferably, as shown in Fig. 7. A groove or recess $i'$ is formed midway between the ends of each of the springs, these grooves being adapted to receive corresponding straight portions $i^2$ of the retaining-spring $i$. The retaining-spring $i$ is provided especially for the purpose of limiting the distention of springs $g$ $g$ $h$ $h$ in a horizontal direction, so that the said springs will not interfere with the spokes of the wheel. The spring $i$ is preferably designed to permit of sufficient distention of the springs in a horizontal direction when the bicycle encounters any ordinary obstacles or ruts. When, however, the wheels encounter an unusual obstruction, the springs $g$ $g$ $h$ $h$ are distended along the lines $x$ $x$ and $y$ $y$, Fig. 6.

The ball inclosed by the springs $g$ $g$ $h$ $h$ is preferably placed into close contact with said springs, whereby all vibratory motion communicated to the springs will be readily absorbed by the ball.

In Figs. 10 and 11 I have shown a modified form of spring-support for bicycle-wheels, in which one complete encircling band of spring metal Z is secured between the plates $c$ $d$ and washers $c^4$ $d^3$, while a semicircular spring $h$ is likewise secured in position between said plates and washers. The retaining-spring $i$ engages said springs, for the purpose hereinbefore set forth. The angularly-disposed springs, which contain the pneumatic cushion, I term a "basket." By employing a spring-support for bicycle or other vehicle wheels composed of springs angularly disposed with relation to each other I am enabled to cause said springs to flex or bend in a uniform direction, one spring governing another placed at an angle thereto. With spring-supports for vehicle-wheels constructed as herein shown and described it will be observed that the springs will always be so acted upon as to permit of the vertical movement only of the wheels with relation to their supporting-frame.

In safety-bicycles of the class illustrated about two-thirds of the weight of the rider is supported upon the rear wheel, and I find it advantageous to provide means for aiding the spring-supports of the rear wheel in their function of securing a uniform motion of said wheel with relation to its supporting-frame. Referring to Figs. 1, 3, 4, and 5, I provide a fork between the hub of the rear wheel and the crank-shaft. The prongs $m$ $m$ are provided with eyes $m'$ $m'$, which loosely surround the extensions of the shaft of the rear wheel. Clamping-blocks $m^2$ $m^2$, surrounding the shaft, are engaged with eyes $m'$ by the nut $m^3$. A washer $m^4$ is interposed between nuts $m^3$ and $d^2$. A second washer $m^5$ is interposed between nut $d^2$ and a sleeve $m^6$, which slips over the shaft $b'$ and is provided with a curved seat adapted to receive one block $m^3$. The hub is also provided with a curved seat adapted to receive the other block $m^3$. A threaded stem $n$ is provided for the prongs $m$ $m$, which is slipped through a sleeve $n'$, uniting the prongs. The stem is longitudinally adjustable by the nut $n^2$, this adjustment being secured by the set-screw $n^3$. The stem $n$ is provided with a second pair of prongs $n^4$ $n^4$, upon the ends whereof are formed eyes $n^5$ $n^5$, which surround the crank-hanger $o$. I preferably divide the stem $n$ longitudinally, each division supporting a prong $n^4$, whereby said prongs may be readily assembled upon the crank-hanger. In mounting the rear wheel I first adjust and secure the spring-supports in position and then adjust the fork.

I use the term "C-spring" in the claims in contradistinction to "helical" springs. It is obvious that the spring-supports may be disposed between the frame and any other axial portion of the wheel than the shaft.

It is obvious that changes may be readily made without departing from the spirit of my invention, and I do not therefore desire to be limited to the precise construction shown; but,

Having thus described my invention, what I claim as new, and desire to secure by Letters Patent, is—

1. In a vehicle, the combination of a frame, with a wheel, a plurality of C-springs interposed between said frame and an axial portion of said wheel, and a spring $i$ which engages the aforesaid springs, substantially as and for the purpose specified.

2. In a vehicle, the combination with a frame, of wheels, spherical cushions of rubber or similar elastic material interposed between said frame and axial portions of said wheels, and baskets of spring metal also interposed between said frame and said axial portions of the wheels containing and adapted to secure said cushions in position, substantially as described.

In witness whereof I hereunto subscribe my name this 17th day of November, A. D. 1896.

HORACE E. HENWOOD.

Witnesses:
GEORGE L. CRAGG,
JOHN W. SINCLAIR.